United States Patent [19]
Lee

[11] Patent Number: 5,889,533
[45] Date of Patent: Mar. 30, 1999

[54] FIRST-IN-FIRST-OUT DEVICE FOR GRAPHIC DRAWING ENGINE

[75] Inventor: Jin-aeon Lee, Yongin-gun, Rep. of Korea

[73] Assignee: Samsung Electronics Co., Ltd., Suwonc, Rep. of Korea

[21] Appl. No.: 800,632

[22] Filed: Feb. 14, 1997

[30] Foreign Application Priority Data

Feb. 17, 1996 [KR] Rep. of Korea ..................... 1996 3960

[51] Int. Cl.$^6$ ...................................................... G06T 1/20
[52] U.S. Cl. ........................... 345/506; 345/513; 395/877
[58] Field of Search ........................... 345/513, 506–508; 711/100; 395/873, 877

[56] References Cited

U.S. PATENT DOCUMENTS 5,473,756  12/1995  Traylor ..................................... 395/877

Primary Examiner—Kee M. Tung
Attorney, Agent, or Firm—Jones & Volentine, L.L.P.

[57] ABSTRACT

A first-in-first-out (FIFO) device for a graphic drawing engine is provided. The (FIFO) device is connected to both a pipeline having a plurality of data processing devices for receiving graphic data from a graphic drawing engine and a drawing engine control portion for controlling the transmission of graphic data of the pipeline. The FIFO device includes a plurality of registers, the number of which is greater than the number of the data processing devices of the pipeline, wherein when the number of vacant registers in the FIFO device is less than that of the data processing devices, a control signal is generated, to thereby stop the operation of the pipeline. Thus, the loss of data stored in the FIFO device can be prevented.

4 Claims, 2 Drawing Sheets

FIRST-IN-FIRST-OUT DEVICE FOR GRAPHIC DRAWING ENGINE

BACKGROUND OF THE INVENTION

1. Field of the Invention

The present invention relates to a first-in-first-out (FIFO) device for a graphic drawing engine, and more particularly, to a FIFO device for a graphic drawing engine used in a computer for preventing loss of graphic data.

2. Description of the Related Art

In a computer, a place for temporarily storing data, i.e., a register, is necessary. In order to store data in and retrieve data from the register, the first-in-first-out (FIFO) method or a first-in-last-out (FILO) method is used. In the FIFO method, the first stored data is withdrawn first while in the FILO method, the first stored data is withdrawn last. The FIFO method can be used for transmission of the graphic data.

FIG. 1 is a block diagram of a conventional FIFO device for a graphic drawing engine. The FIFO device includes only one register 11 for storing data which is output during the application of a clock (CK) signal and a write enable (WEN) signal.

FIG. 2 is a block diagram of a conventional graphic drawing engine using the FIFO device of FIG. 1. The graphic drawing engine includes a drawing engine portion 21 and a pipeline 23 for temporarily storing data transmitted from the drawing engine portion 21. A FIFO device 31 temporarily stores the data received from the pipeline 23. A drawing engine controller 33 receives a FIFO-full signal from the FIFO device 31 and controls the output of data stored in the pipeline 23. The pipeline 23 includes N data processing devices, with, for example, three data process devices 25, 27 and 29 being shown in FIG. 2.

Referring to FIG. 2, when the FIFO device 31 is not full of data, the FIFO-full signal is disabled and the WEN signal of the drawing engine controller 33 is enabled. The graphic data transmitted from the drawing engine portion 21 is stored in the pipeline 23, and the stored data is transferred to the FIFO device 31 according to the CK signal and the WEN signal input thereto.

When the FIFO device 31 is full of data, the FIFO-full signal is enabled, and the drawing engine portion 33 disables the respective WEN signals connected to registers 25, 27 and 29 in the pipeline 23. The operation of the pipeline 23 is terminated, and no data is transmitted to the FIFO device 31.

In the conventional FIFO device for a graphic drawing engine, when the FIFO device is full of data, during the time when graphic data is stored in the FIFO device, and when a FIFO-full signal is enabled, the data stored in the pipeline is continuously transmitted to the FIFO device, to thereby overlap with the data which has already been stored. Thus, part of the data may be lost.

SUMMARY OF THE INVENTION

Accordingly, it is an object of the present invention to provide a first-in-first-out (FIFO) device for a graphic drawing engine for preventing loss of graphic data.

To accomplish these and others of the present invention, there is provided a first-in-first-out (FIFO) device for a graphic drawing engine connected to both a pipeline having a plurality of data processing devices for receiving graphic data from a graphic drawing engine and a drawing engine control portion for controlling the transmission of graphic data of the pipeline, the FIFO device comprising a plurality of registers, having a number that is greater than a number of the data processing devices of the pipeline, wherein, during the operation of the pipeline, when a number of vacant registers in the FIFO device is less than that of the number of data processing devices, a control signal is generated to stop the operation of the pipeline.

In another aspect, there is provided a method for controlling the transmission of graphic data using a first-in-first-out (FIFO) device comprising the steps of: providing a plurality of registers in the FIFO device, having a number that is greater than a number of data processing devices in a pipeline; determining, during the operation of the pipeline, whether a number of vacant registers in the FIFO device is less than that of the number of data processing devices; and generating a control signal to stop the operation of the pipeline when the number of vacant registers in the FIFO device is less than that of the number of data processing devices.

According to the present invention, it is possible to prevent loss of the graphic data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
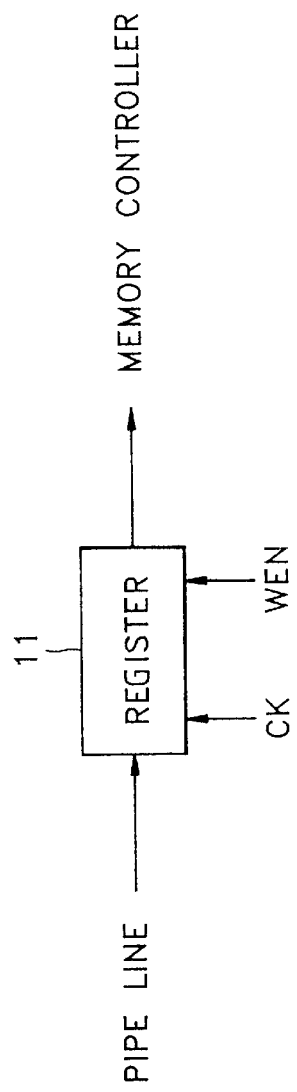
FIG. 1 is a block diagram of a conventional FIFO device for a graphic drawing engine.
Figure 2:
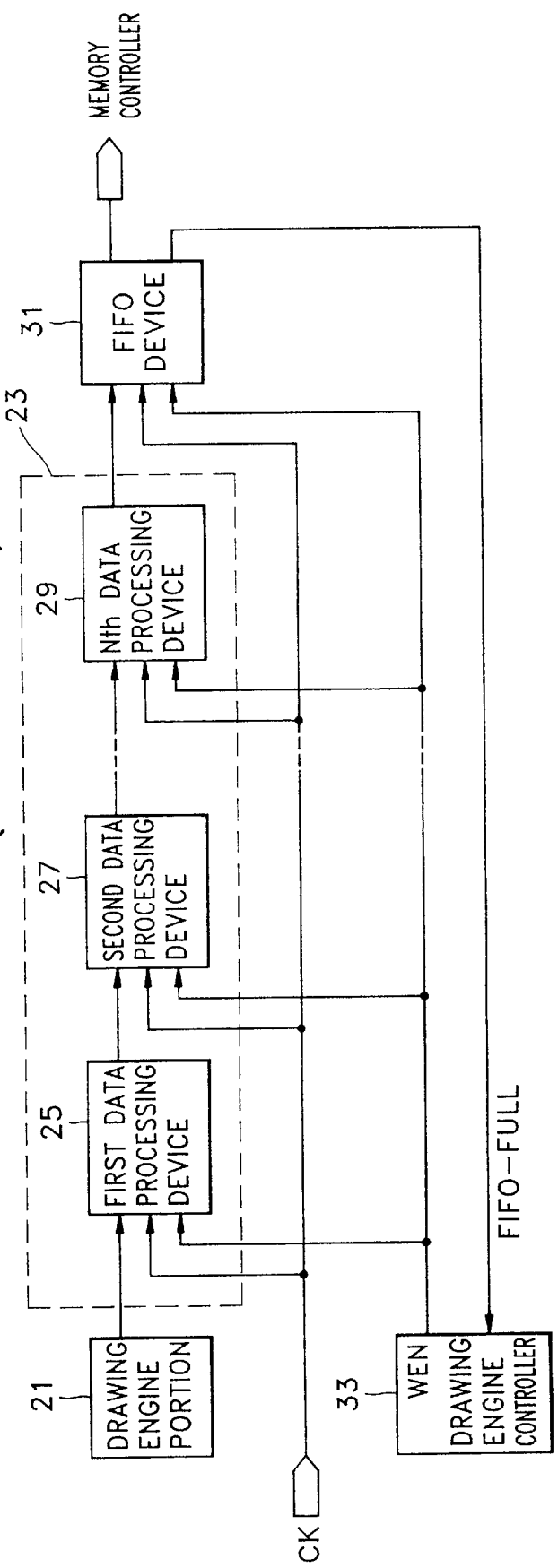
FIG. 2 is a block diagram of a conventional graphic drawing engine using the FIFO device of FIG. 1.
Figure 3:
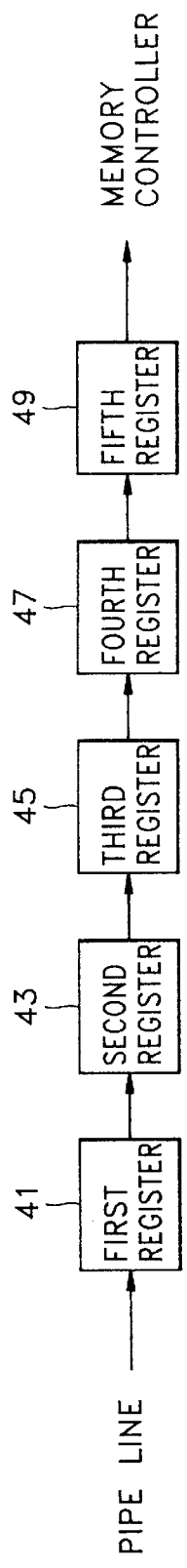
FIG. 3 is a block diagram of a FIFO device for a graphic drawing engine according to the present invention.

Referring to FIG. 3, the FIFO device of the present invention includes five registers 41, 43, 45, 47 and 49 for storing data. The data stored in the registers 41, 43, 45, 47 and 49 is output in response to clock (CK) signals and write enable (WEN) signals.

Figure 4:
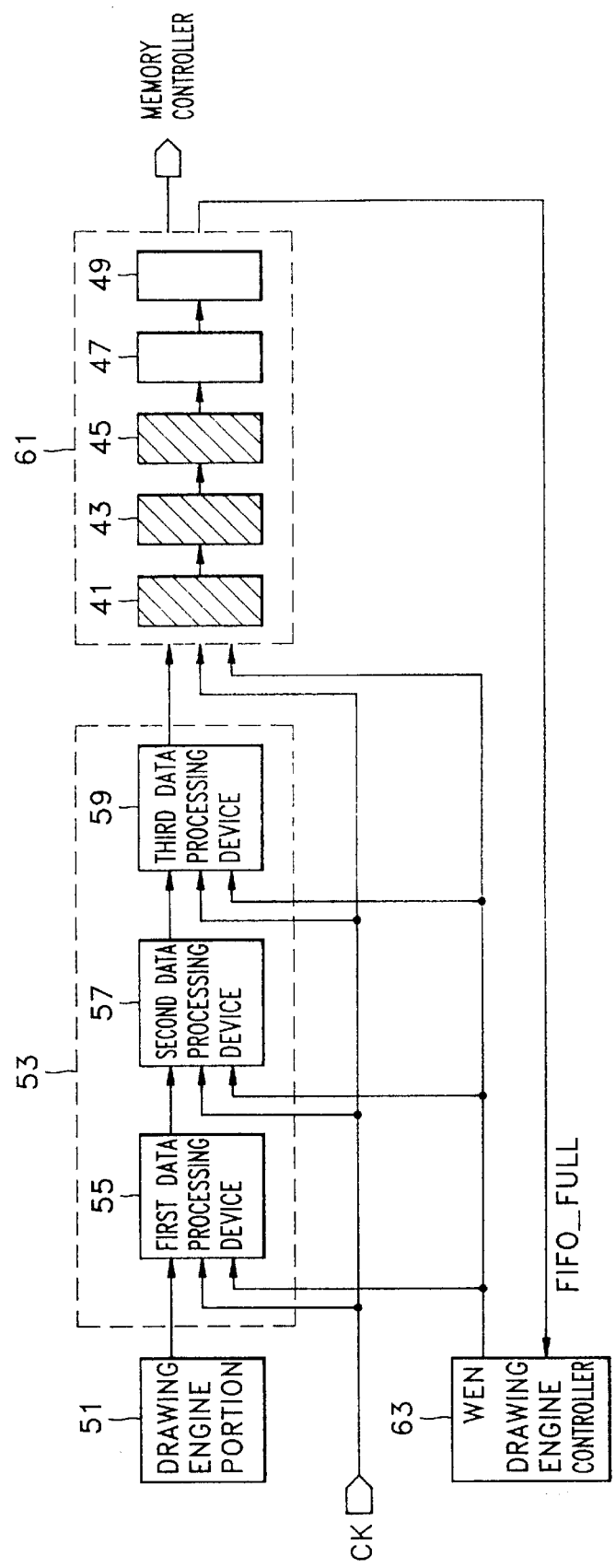
FIG. 4 is a block diagram of the graphic drawing engine using the FIFO device of FIG. 3.

Referring to FIG. 4, the graphic drawing engine includes a drawing engine portion 51 and a pipeline 53 for temporarily storing data transmitted from the drawing engine portion 51. A FIFO device 61 temporarily stores the data received from the pipeline 53. A drawing engine controller 63 receives a FIFO-full signal from the FIFO device 61 and controls the output of data stored in the pipeline 53. As shown in FIG. 4, the pipeline 53 includes three data processors 55, 57 and 59, and the FIFO device 61 includes five registers 41, 43, 45, 47 and 49. It is understood that any number of registers and data processors may be used within the scope of the present invention, so long as the number of registers exceeds the number of data processors.

Since data is not initially stored in the FIFO device 61, the FIFO-full signal is disabled and the WEN signal is enabled. Here, the drawing engine portion 51 transmits graphic data to respective data processors 55, 57 and 59 of the pipeline 53, and the data is sequentially stored in the first through fifth registers 41, 43, 45, 47 and 49 of the FIFO device 61 according to the disabled FIFO-full signal and the enabled WEN and CK signals. As shown in FIG. 4, when data is stored in the first, second and third registers 41, 43 and 45, the FIFO device 61 activates the FIFO-full signal. Then, the drawing engine controller 63 deactivates the WEN signal as soon as the FIFO-full signal is enabled, to thereby stop the data transmission from the pipeline 53. Thus, no data from the pipeline 53 is transmitted to the FIFO device 61. When data from the third register 45 is eventually output to a memory controller, the FIFO-full signal is disabled and the WEN signal is enabled, to thereby resume the transmission of data stored in the pipeline 53. Accordingly, when data is stored in three or more registers among the registers 41, 43, 45, 47 and 49 of the FIFO device 61, the FIFO-full signal is enabled and no data is transmitted from the pipeline 53. Thus, data loss of the FIFO device 61 can be prevented.

According to the present invention, when the number of vacant registers of the FIFO device 61 is less than that of the number of data processors of the pipeline 53, the data stored in the pipeline 53 cannot be transmitted to the FIFO device 61, to thereby safely retain the data stored in the FIFO device 61.

Although a preferred embodiment of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

What is claimed is:

1. A first-in-first-out (FIFO) device for a graphic drawing engine connected to both a pipeline having a plurality of data processing devices for receiving graphic data from a graphic drawing engine, and a drawing engine control portion for controlling the transmission of graphic data of said pipeline, said FIFO device comprising a plurality of registers, having a number that is greater than a number of said data processing devices of said pipeline, wherein, during the operation of said pipeline, when a number of vacant registers in said FIFO device is less than that of said number of data processing devices, a control signal is generated to stop the operation of said pipeline.

2. A FIFO device for a graphic drawing engine according to claim 1, wherein, when the operation of said pipeline is stopped, and the number of said vacant registers of said FIFO device is equal to or greater than that of said number of data processing devices, the operation of said pipeline resumes.

3. A method for controlling the transmission of graphic data using a first-in-first-out (FIFO) device having a graphic drawing engine connected to both a pipeline having a plurality of data processing devices for receiving graphic data from a graphic drawing engine, and a drawing engine control portion for controlling the transmission of graphic data of said pipeline, the method comprising the steps of:

providing a plurality of registers in the FIFO device, having a number that is greater than a number of said data processing devices of said pipeline;

determining, during the operation of said pipeline, whether a number of vacant registers in the FIFO device is less than that of said number of data processing devices; and generating a control signal to stop the operation of said pipeline when the number of vacant registers in the FIFO device is less than that of said number of data processing devices.

4. The method as in claim 3, further comprising the steps of determining, while the operation of said pipeline is stopped, whether the number of vacant registers in the FIFO device is equal to or greater than that of said number of data processing devices; and resuming the operation of the pipeline when the number of vacant registers in the FIFO device is equal to or greater than that of said number of data processing devices.

* * * * *